Figure 1:
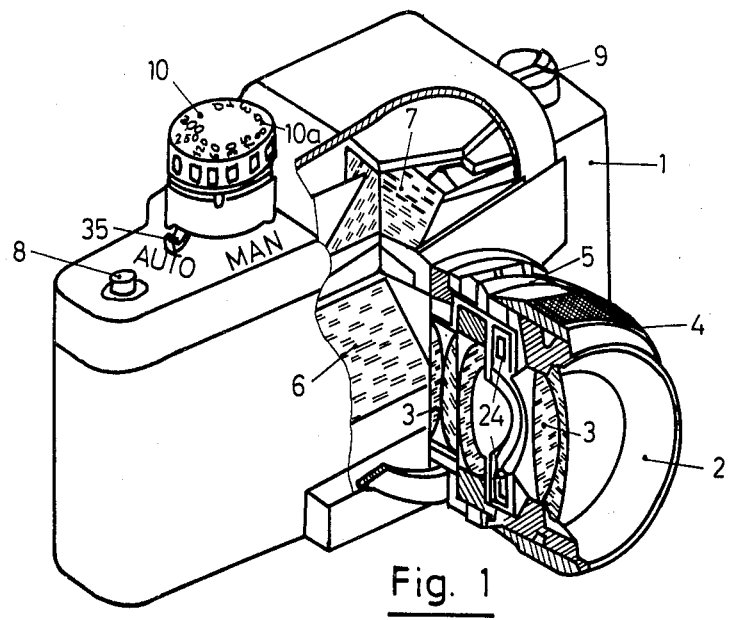

United States Patent [19]

Starp

[11] 4,349,256

[45] Sep. 14, 1982

[54] PHOTOGRAPHIC CAMERA SUCH AS A REFLEX CAMERA

[76] Inventor: Franz Starp, Mittlere Steige 36, 7547 Wildbad 5, Fed. Rep. of Germany

[21] Appl. No.: 217,900

[22] Filed: Dec. 18, 1980

[30] Foreign Application Priority Data

Dec. 19, 1979 [DE] Fed. Rep. of Germany ....... 2951006

[51] Int. Cl.³ .................. G03B 7/085; G03B 9/06; G03B 9/07
[52] U.S. Cl. ........................................ 354/43; 354/271
[58] Field of Search ................................ 354/43, 271

[56] References Cited

U.S. PATENT DOCUMENTS 3,654,843 4/1972 Ueda et al. .................. 354/43 X
4,227,792 10/1980 Rentschler ................... 354/271 X Primary Examiner—Michael L. Gellner
Attorney, Agent, or Firm—Arthur A. March

[57] ABSTRACT

A photographic camera having an objective incorporating an electrodynamic driving system for the diaphragm system, and also having a selector adjustable for a manual or automatic mode, in which the driving member for the diaphragm blades has a path limiting stop associated therewith which is selectively variable in its basic position by a manually operated diaphragm preselector ring, and which stop, in the manual mode, cooperates with a counterstop pin on the driving member to determine the correspondingly manually preselected position of the diaphragm blades, e.g. following shutter release on a camera with full aperture viewing, but which stop, in the automatic mode, is not utilized.

10 Claims, 9 Drawing Figures

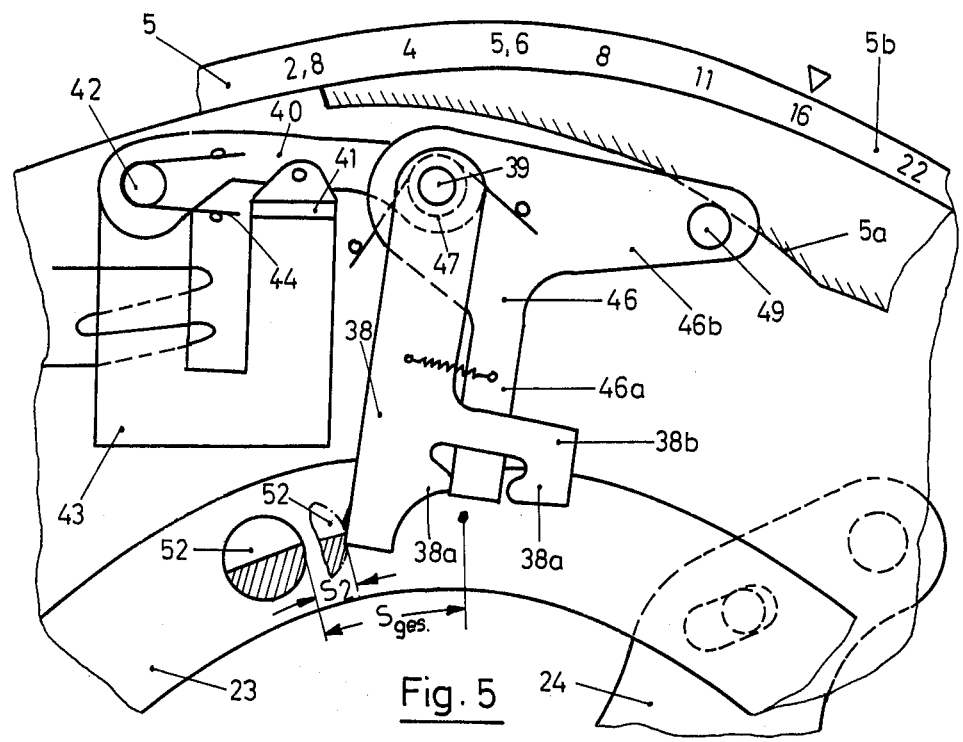
Fig. 5
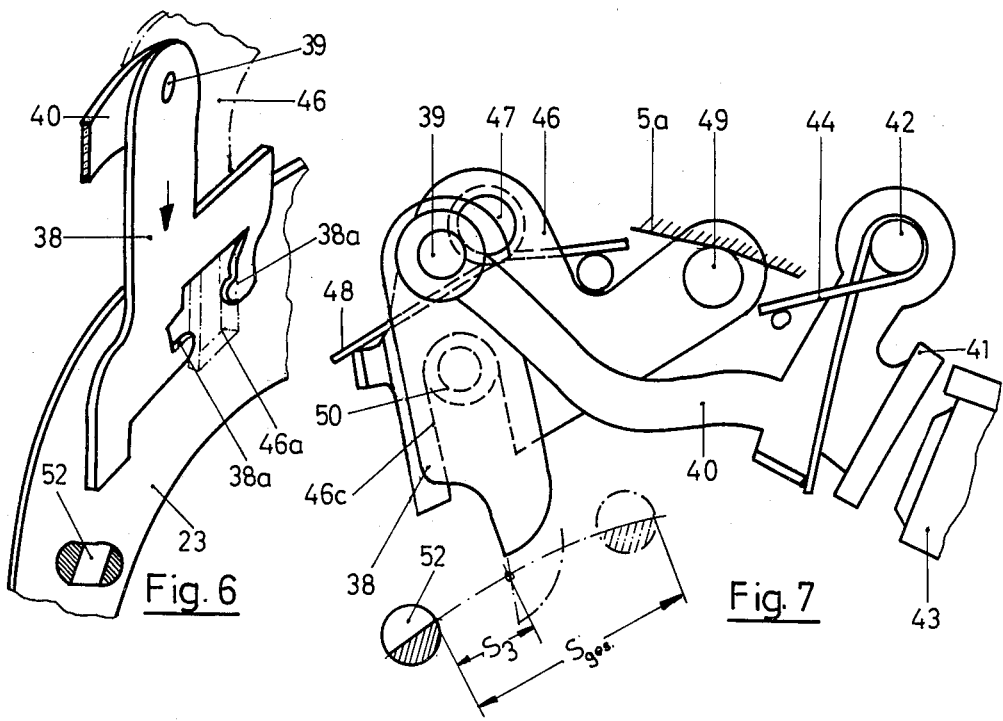
Fig. 6
Fig. 7

PHOTOGRAPHIC CAMERA SUCH AS A REFLEX CAMERA

The present invention relates to a photographic camera, more especially a reflex camera, of the general kind having an objective incorporating an electrodynamically drivable diaphragm blade system and a selector adjustable to a manual mode "MAN" and at least one automatic operating mode "AUTO," which when adjusted to the manual mode "MAN" causes the diaphragm to be set to a manually preselected adjusted aperture width, and which when adjusted to the at least one automatic mode "AUTO" causes the diaphragm to be set to a light-dependent adjusted aperture.

To the user, the operation of a conventional camera of the above kind can prove to be vague and therefore problematic, since when resetting the camera from a "MAN" mode to an "AUTO" mode, besides the mode selector, a further setting member for manual adjustment of the corresponding exposure parameter also has to be moved to the setting position "AUTO" associated with the setting scale of this setting member. In all, therefore, two control operations have to be effected to achieve such resetting. The necessity of this additional control operation is founded on the fact that until it has been carried out it is not possible to put out of function the control member for setting the preselected corresponding exposure parameter in the "MAN" mode. In this regard, if the setting or resetting of the manual setting member serving the corresponding exposure setting in the "MAN" mode is not also taken into account or is forgotten, the conditions for a light-adequate exposure of the film material are no longer achievable.

It is among the objects and advantages of the present invention to avoid the foregoing drawbacks and deficiencies of such known photographic cameras which are settable or resettable to various modes, and to provide a camera of this general type which is simple to operate and trouble free in its manipulation especially when resetting the camera from one mode to the other.

Figure 2:
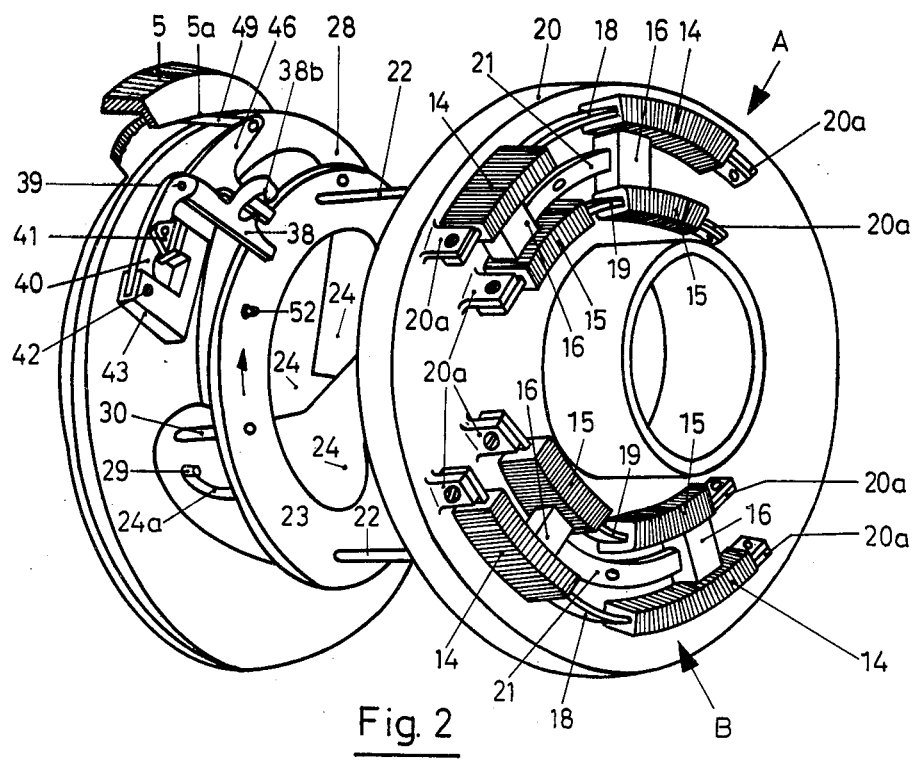
Figure 3:
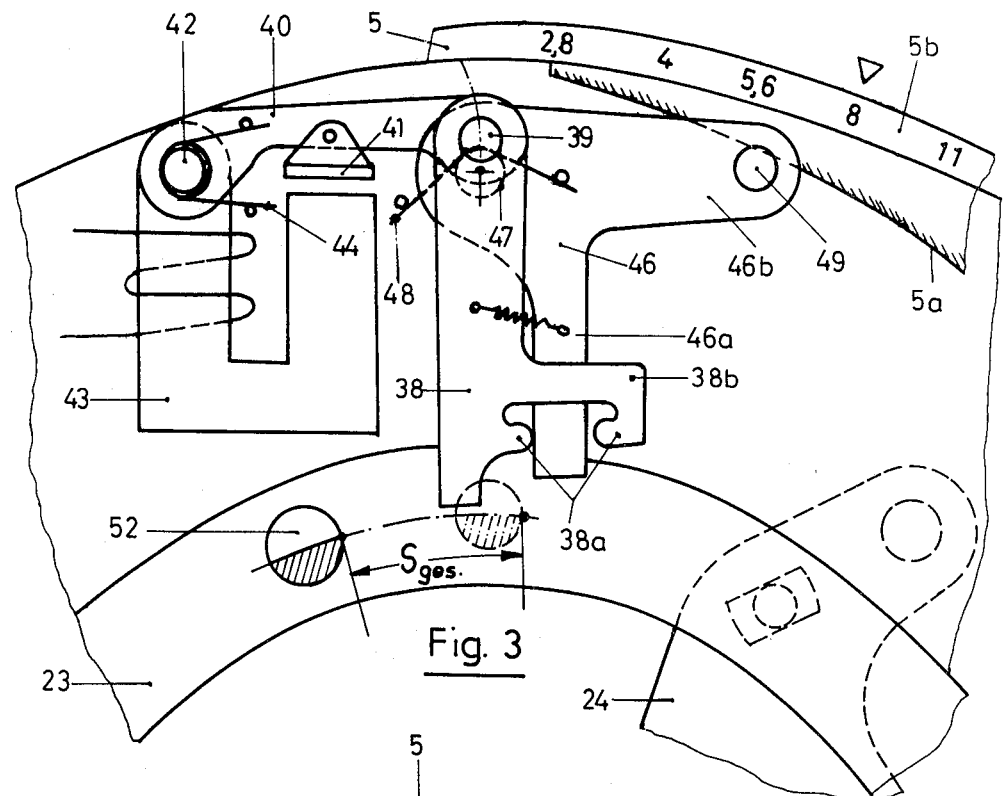
Figure 4:
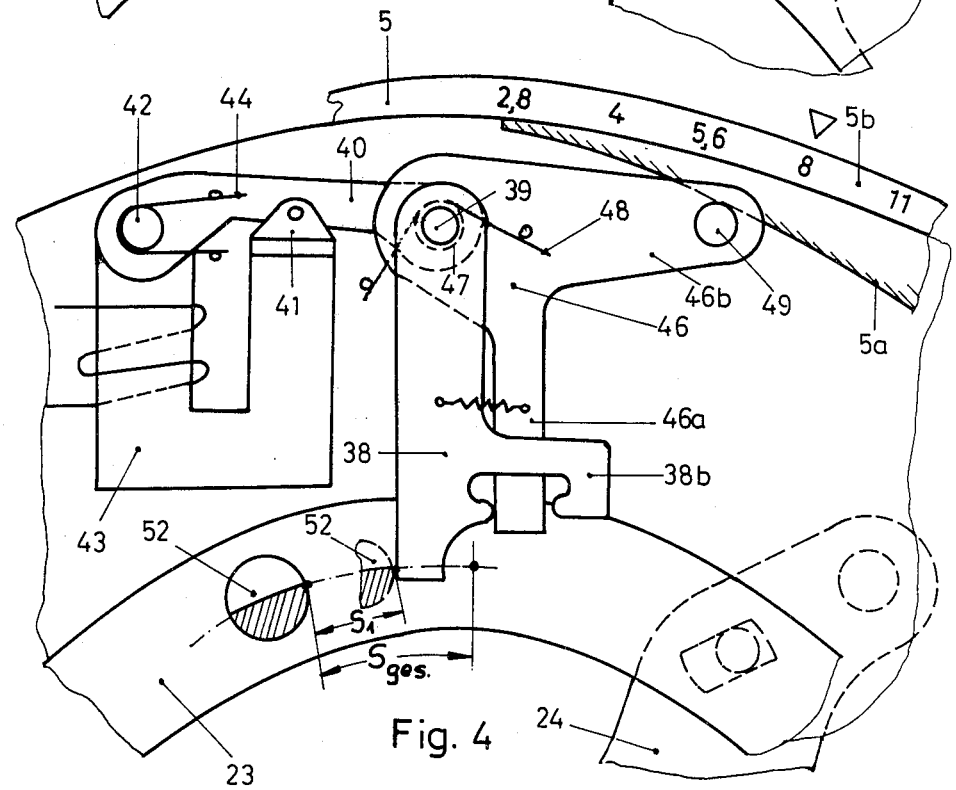
Figure 8:
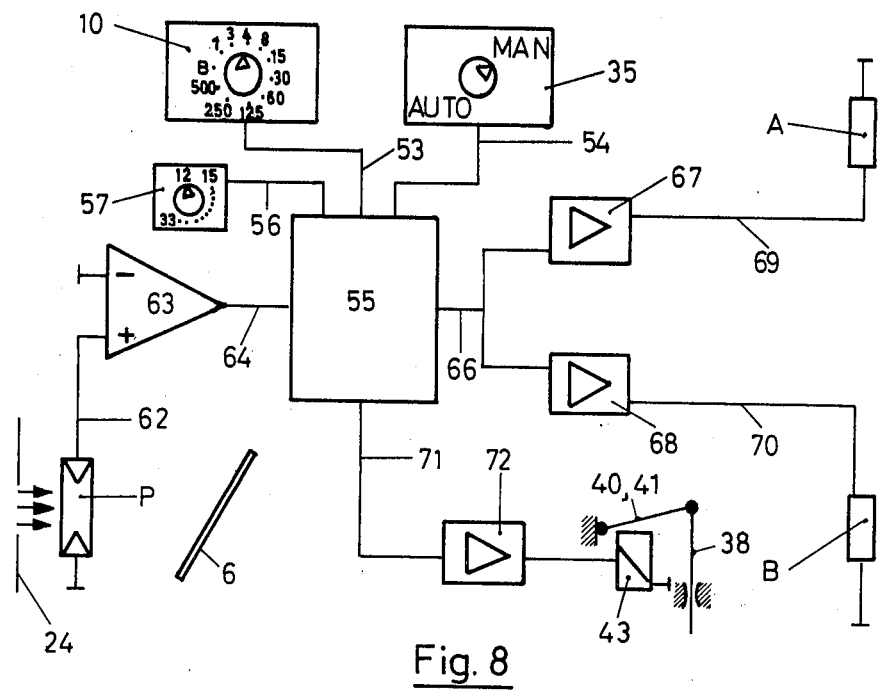
Figure 9:
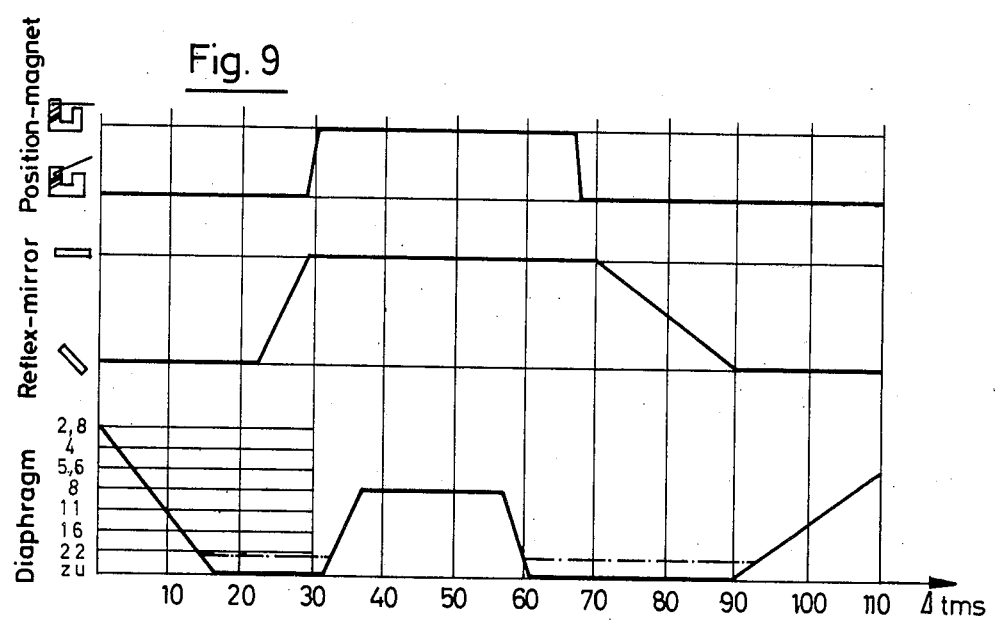

Other and further objects and advantages of the present invention will become apparent from a study of the within specification and accompanying drawings, in which FIG. 1 is a schematic perspective view of a single lens reflex camera according to the present invention showing the objective in longitudinal section, FIG. 2 is a schematic perspective, exploded view of the electronically drivable diaphragm blade system incorporated in the objective of the camera of FIG. 1, FIG. 3 is a schematic enlarged partial view of an embodiment of an electromagnetically actuatable travel limiting stop incorporated in the objective of FIG. 2, shown in the starting or inactive location stop position, and which stop determines the aperture width of the diaphragm blade system, FIG. 4 is a schematic view similar to FIG. 3 but which shows the travel limiting stop in a first active location stop position, FIG. 5 is a schematic view similar to FIG. 4 but which shows the travel limiting stop in a selectively adjustably different active location stop position, FIG. 6 is a schematic enlarged perspective partial view of the travel limiting stop of FIGS. 3 to 5 illustrating details of construction, FIG. 7 is a schematic enlarged partial view of an alternative embodiment of the travel limiting stop having an electromagnet for its actuation located substantially tangential to the driving member used for actuating the diaphragm blades, FIG. 8 is a schematic view which shows a block diagram of an electronic control circuit suitable for setting manual and light-dependent aperture values for the camera of FIG. 1, and FIG. 9 is a schematic diagram of the function cycle of the objective for the single lens reflex camera of FIG. 1 fitted with the travel limiting stop according to the present invention.

According to the present invention, a photographic camera, more especially a reflex camera, is provided which has an objective incorporating an electrodynamically drivable diaphragm blade system and a selector adjustable to a manual mode "MAN" and to at least one further, automatic mode "AUTO," and which when adjusted to one or the other mode, i.e. "MAN" or "AUTO," causes the diaphragm to be adjusted correspondingly to a manually preselected aperture width adjusted in dependence upon sensed ambient light, as the case may be, and in which a driving member for actuating the diaphragm blades has associated therewith an electromagnetically actuatable path limiting stop which is selectively variable in its basic stop position by means of a manually actuated diaphragm preselector.

Advantageously, the path limiting stop, when the camera is set to the method of operation or mode "MAN," on command of an appropriately provided electronic control circuit, functions to terminate the adjustment movement of the diaphragm blades in accordance with the aperture preselection, but which, when the camera is set to the method of operation or mode "AUTO," is not utilized.

By this arrangement, there is achieved the result that when resetting from the "MAN" to the "AUTO" region or mode, only a single operational manipulation is required, i.e. exclusively effecting the resetting of the mode selector setting member, which in turn is favorable in that the operator is able to concentrate fully on looking at the object to be photographed without the risk of having forgotten the operating manipulations for taking the intended photograph.

In a preferred further development according to the present invention, the travel limiting stop is drivable relative to the direction of movement of the driving member for actuating the diaphragm blades and is resettable or settable into or out of a basic stop position at right angles to its direction of movement, i.e. movable from a variable basic or inactive location stop position to a corresponding active location stop position for terminating the adjustment movement of the driving member.

A structurally favorable preferred arrangement for determining the aperture width in the "MAN" region or mode and avoiding additional intermediate or transmitting members may be obtained by mounting the electromagnetically actuatable path limiting stop relatively displaceably on a setting lever which is rotatably mounted on a fixed pivot and such that the setting lever with regard to its relative or basic position may be selectively varied by means of a control cam arranged on the manual aperture preselector.

According to a further preferred arrangement, the path limiting stop may be brought indirectly or directly into the corresponding active location stop position by the anchor lever of an electromagnet connected in the circuit of an electronic control circuit in the arrangement.

In order to allow a counterstop pin, cooperating with the path limiting stop, to be used on the driving member as and if necessary for desired adjustment purposes, it may be provided, moreover, that the region of the counterstop pin which cooperates with the path limiting stop, advantageously has a hemispherical cross sectional shape to facilitate coaction under the proper functional conditions.

Referring to the drawing, and initially to FIG. 1, the body 1 of a single lens reflex camera, e.g. fitted with a focal plane shutter (not shown), contains a lens housing arrangement or objective 2. Besides the lenses 3, the objective 2 has an electrodynamically drivable diaphragm blade system (FIG. 2). The objective 2 also has a manual focal distance setting ring 4 for focussing purposes and a further manual diaphragm aperture setting ring 5 for the manual presetting of the aperture width of the diaphragm blade system.

A reflex mirror 6 is located in the camera body 1 along with a pentaprism viewfinder 7, a shutter release button 8, a film rewind crank 9, and a shutter speed setting member 10 for the focal plane shutter or other type shutter of the camera.

Further description of other structural components of the camera may be dispensed with since they are conventional and not required for an understanding of the pertinent elements of the present invention.

Suitably, an electrodynamic drive is provided for actuating the electrodynamically drivable diaphragm blade system, which as shown in FIG. 2 includes associated pairs of magnetic coils 14 and 15 and in turn permanent magnets 16 which are associated with each given pair of such coils. While the corresponding magnetic coils 14 and 15 are wound onto magnetic contact segments 18 and 19 and the latter are stationarily secured to projections 20a of a stationary base plate 20, the permanent magnets 16 are each mounted on reciprocally rotatable supports 21, which by means of, e.g. coaxially arranged, pins 22, are in direct operational engagement with a conjointly reciprocally rotatably mounted driving member 23 for the diaphragm blades 24 of the diaphragm blade system.

The pins 22 are passed through corresponding arcuate slots (not shown) machined in the base plate 20 so as to permit rotational movement of the magnets and in turn of the driving member 23 upon energization of the corresponding sets of magnetic coils 14 and 15, i.e. in one or the other direction.

As long as a sufficient energy requirement is accordingly provided, it will be realized that it would be possible to use only one electrodynamic driving system for the diaphragm blade drive in place of the two diametrically opposed drives as shown, whereby the second driving system could be provided, for example, for driving an interlens shutter segment system (not shown) which may be incorporated in the usual manner in the objective 2, i.e. in addition to or in place of such focal plane shutter.

As shown in FIG. 2, a further base plate 28 is stationarily located in the objective housing which has a plurality of correspondingly stationary pins 29 engaging in slots 24a provided in the reciprocally arranged diaphragm blades 24 in the usual manner. The geometric shape and course of the slots 24a is so selected that the blades 24, in operational engagement respectively with the driving member 23 by means of a correponding further pin 30, are moved out of their initial, e.g. completely closed, position in accordance with a widening of the diaphragm aperture, as soon as the driving member 23 is actuated by the electrodynamic driving systems comprised of parts 14 to 20, whereby the driving member 23 executes a rotary movement in the direction of the arrow indicated in FIG. 2.

This rotary movement always occurs when the corresponding magnetic coils 14 and 15 are energized with a flow of current in a definite or given direction, whereas, upon reversal of the direction of flow of the current in the magnetic coils 14 and 15, the associated permanent magnets 16 are moved in an opposite direction, whereby the driving member 23 and the diaphragm blades 24 reciprocally return to the previously assumed initial position, as the artisan will appreciate.

As is further evident from FIG. 1, apart from the shutter speed setting member 10 and the diaphragm aperture setting ring 5, the camera is also fitted with a mode selector 35, adjustable alternatively to the manual mode "MAN" or to the automatic mode "AUTO." This mode member or selector 35 cooperates with an associated electronic control circuit described in detail below in such a manner that in the "AUTO" mode the aperture width of the diaphragm blades is automatically adjusted in dependence upon the incident ambient light on a photodiode P arranged behind the objective diaphragm in the usual manner, while in the "MAN" mode the determination of the aperture width of the diaphragm blades is effected by means of an electromagnetically actuatable path limiting stop 38, the position of which, relative to the driving member 23, is selectively variable by means of the aperture setting ring or preselector ring 5.

Thus, when the mode setting member or selector 35 is adjusted to the position "MAN," the path limiting stop 38 cooperating with the driving member 23 is in functional readiness in order to determine, on command of the conventional electronic control circuit, e.g. after shutter release in reflex cameras with full aperture viewing, the actual exposure parameters of the film prior to certain camera operations, such as for instance returning the mirror 6 from the viewing position to the out of the way or light path exposure position and the diaphragm blades 24 to the selected stop position in accordance with FIGS. 4, 5 and 7 in good time before the opening and closing of the camera shutter (cf. FIG. 9).

If it is intended to take into account the usual simple exposure metering in a reflex camera as known from the other types of cameras and also to measure the incident ambient light through the viewfinder and reaching the photodiode P by eliminating this brightness value during the subsequent formation of the operating diaphragm aperture, then the selective positioning of the path limiting stop 38 can occur only at a point in time preceded by the complete closure of the diaphragm blades.

As applied to the control of the above-described electrodynamically drivable diaphragm blade system, this means that the diaphragm blades 24 first have to be moved into a position completely blocking the passage of light from which they instantly open, but then terminate their opening movement in accordance with the selective adjustment position of the path limiting stop 38 which in the meantime has moved into its operating or active location stop position, as shown in FIG. 9.

Of course, as the artisan will appreciate, in those cameras in which the elimination of extraneous light is dispensed with, it is sufficient if the diaphragm blades are returned to the smallest aperture width, as indicated in chain-dotted lines in FIG. 9, in order then to open again for the desired purposes.

It will be appreciated that the corresponding parts in the embodiment of FIG. 7 operate in like manner to those in the embodiment of FIGS. 3 to 6, although in different spatial orientation and comparable analogous structural association and operative connection.

Hence, as shown by the embodiments in FIGS. 3 to 6 and 7, the path limiting stop 38 may be formed as a slide-like guide part operatively variable in its radial setting position relative to the driving member 23 and which is hingedly connected to an anchor lever 40, 41 at one end by means of a floating hinge pin 39. The anchor lever 40, 41 in turn is pivotably mounted on a fixed journal 42 and associated with an electromagnet 43 so that, in the event of the electromagnet 43 being energized, the stop 38 is moved from a mainly inoperative or inactive location starting position against the force of a return spring 44 into the operative or active position shown in FIGS. 4 and 5, and as correspondingly shown in chain-dotted lines in FIG. 7.

The freely pivotable end of the stop 38 hanging from the floating hinge pin 39 is retained by an arm 46a of a rotatable bell crank lever or toggle lever 46, securely mounted on a fixed pivot at 47, i.e. behind or under the floating hinge pin 39 (cf. FIG. 6).

The other arm 46b of the toggle lever 46 abuts via the toggle lever pin 49 a control cam 5a formed on the aperture setting ring 5 and is retained in positive abutment therewith subject to the action of a spring 48.

While in accordance with the embodiment shown in FIGS. 3 to 6, it is clear that displacement of the slide-like, guided stop 38 occurs relative to the arm 46a of the toggle lever 46, appropriately guided by laterally cranked or offset cams 38a, on the other hand in the embodiment of FIG. 7, the stop 38 is brought into locking engagement with the toggle lever 46 by a member 50 on the stop 38 engaging through a slot 46c in the toggle lever 46. In either case, this type of operative arrangement permits the stop portion 38 to execute a relative displacement in the radial direction relative to the associated toggle lever 46 guiding it.

A counterstop pin 52, preferably having a hemispherical cross sectional shape, and stationarily located on the driving ring 23 for the diaphragm blades 24, cooperates with the stop 38 but only when the electromagnet 43 is activated, i.e. when the magnet anchor lever 40, 41 is attracted, and consequently the stop 38 is displaced at the selectively adjustable stop position from its inactive location, remote from the movement path of the driving member 23 and in turn of the counterstop pin 52, and into the movement path of the driving member 23 and such counterstop pin 52. When this has occurred, the pin 52 strikes against the stop 38, whereby the further movement of the driving member 23 for opening the diaphragm blades is terminated.

In accordance with the presetting determined by the control cam 5a formed on the manually adjusted setting ring 5, as indicated in FIGS. 4, 5 and 7, the stop 38, after covering an adjustment movement distance $S_1$ or $S_2$ or $S_3$, as the case may be, stops at a selective stop position or adjustable point which determines the aperture width in accordance with that preset on the aperture scale 5b.

In this connection, it is clear that the functional readiness or operativeness of the path limiting stop 38 is limited exclusively to the setting of the "MAN" mode and, moreover, that the path limiting stop 38 remains in this adjusted stop position once assumed, relative to the stroke path S and the counterstop pin 52, for as long as the aperture setting ring 5 remains adjusted to the aperture value corresponding to this stop position. This does not change when the mode selector 35 is thereafter, e.g. immediately, reset from the "MAN" mode to the "AUTO" mode, nor even when it is once more reset to the "MAN" mode from the "AUTO" mode, e.g. only after carrying out one or more exposures with a light-dependent automatic diaphragm aperture setting.

Advantageously, a special setting position "AUTO" on the diaphragm presetting ring 5 is thus neither necessary nor important, since the path limiting stop 38, when in the inactive location at such stop position or adjustable point, is located outside of the movement path of the counterstop pin 52, not only in the automatic mode of the camera but also in the manual mode thereof. Even during manual diaphragm preselection, the stop 38 is only swung briefly into the active location path limiting stop position during the movement of the driving part 23, thereby causing the setting of the diaphragm blades 24, and after a short time period automatically returns again into the inactive location or inoperative stop position, i.e. after the counterstop pin 52 had made contact therewith for the desired purpose.

The reason why the path limiting stop 38 is operative during the setting of the "MAN" mode only during a certain phase of the functional cycle of the camera and even then only temporarily is explained by the fact that, e.g. with a reflex camera with full aperture viewing, for light metering through the objective, and possibly also taking into consideration the extraneous light entering through the view finder lens, and as is clear from a consideration of FIGS. 8 and 9, the diaphragm blade system, before assuming the aperture width adequate for the manually preselected aperture value, must first be transformed from the fully open position to the fully closed position. Prior thereto, the diaphragm blades are at the fully open position for the purpose of ascertaining the light quantity entering through the beam path of the objective by means of the photodiode P and for feeding this information automatically into the computer process in the usual way for determining the corresponding exposure parameter or parameters.

The driving part 23 for the diaphragm blades 24 must therefore first be moved in one direction over its entire stroke path S in order then to return from the end reference position reached, which is identical with the complete closure of the diaphragm blades, in the opposite direction until the counterstop pin 52 makes contact with the path limiting stop 38 which has in the meantime entered into the movement path of such pin 52 on the driving part 23 so that the latter then comes to a stop. Hence, the diaphragm blades 24 have reached the aperture width preset by way of the aperture setting scale 5b.

FIG. 8 shows a block diagram of an electronic circuit of the conventional type, electrically energized in the usual manner, e.g. by a battery or the like (not shown), for controlling the exposure parameters "time" and "aperture" of the camera as provided with such "MAN" and "AUTO" modes. The setting devices 10 and 35, for effecting correspondingly the presetting of the exposure parameter "time" and the selection of the operational mode "MAN" or "AUTO," are connected by means of leads 53 and 54 to a conventional microcomputer 55, which appropriately stores all the commands for the exposure function of the camera and evaluates these in a computing process in the usual manner. The data fed from both setting devices 10 and 35 are communicated electrically to the microcomputer 55 as a resistance value or a switching pulse in conventional manner.

Likewise, via the lead 56, the preset value at the setting member 57 for the film speed of the film being used is also communicated to the microcomputer 55 in the usual way.

The photodiode P for sensing ambient light is connected by means of a lead 62 to the non-inverting input of an operational amplifier 63, which acts as a photocurrent amplifier and informs the microcomputer 55 of the electrical data via an output lead 64 in conventional manner.

The microcomputer 55 also has an output lead 66 which is connected to two switches 67 and 68, and via these two switches, the magnetic coils 14 and 15 of the two electrodynamic driving systems A and B, for diaphragm blades 24, are supplied with current in the normal manner. For this purpose, the electrodynamic driving system A is connected via the lead 69 to the switch 67 and the driving system B is connected via the lead 70 to the switch 68.

Finally, it is also necessary to mention the electromagnet 43 for actuating the stop 38, which electromagnet on command of the electronic control circuit is energized via a lead 71 and a switch 72 in the desired manner.

The timing of the activation of the electromagnet 43, relative to the electrodynamically energized movement cycle of the diaphragm blade system 24 located in the objective, and relative to the positional change of the viewing mirror 6, is evident from the functional cycle diagram shown in FIG. 9.

A series of diaphragm values is shown in FIG. 9, including those corresponding to the setting region of a diaphragm system, i.e. between fully open position and fully closed position, as shown in full lines, and by way of symbolic illustrations those corresponding to the alternative positions of the viewing mirror 6, i.e. at the inoperative or out of the way position for exposing the light path and the operative or angular mirror viewing position, as well as those corresponding to the electromagnets 43, i.e at the active location and inactive location stop positions of stop 38, all in timed relation with the electrodynamically energized movement cycle of the diaphragm blades 24.

In operation, it is evident from FIG. 9 that after the camera release button 8 is pressed, the diaphragm blades 24 in controlled circuit sequence initially move from the fully open position to the fully closed position, whereupon after a short time interval the mirror 6 is moved out of the angular viewing position into the other alternative or out of the way horizontal position thereby exposing the light path or beam path, while the diaphragm blades are still maintained in the fully closed position. After the mirror 6 had thus exposed the light path, the electromagnet 43 is activated on command of the electronic control circuit and instantly attracts the anchor lever 40, 41 and simultaneously pivots the path limiting stop 38 from the inactive location stop position to the active location stop position, and thus into the movement path of the counterstop pin 52 associated with the driving member 23.

In reply to a further command of the electronic control circuit, the coils 14 and 15 of both electrodynamic driving systems A and B are energized and, via the driving member 23, they move the diaphragm blade system from the fully closed position until the counterstop pin 52 makes contact with the path limiting stop 38 in its operative location stop position. The diaphragm blades 24 have then reached the aperture width corresponding to the manual diaphragm preselection (aperture value "8" in this example).

The diaphragm blades 24 remain in this manually predetermined setting position until the film material has been exposed by the sequentially ensuing opening and closing of the camera shutter, i.e. in accordance with the predetermined exposure time. Subsequently thereto, the coils 14 and 15 of the electrodynamic driving systems A and B are energized again, but this time in the opposite direction, whereupon the diaphragm blades return to the original completely closed position. In concordant timed sequence, the renewed command of the microcomputer 55 deactivates the electronic control circuit of the electromagnet 43, whereupon the latter releases the anchor lever 40, 41 and hence the path limiting stop 38 is released to return under the action of the spring 44 to the inoperative location stop position.

As soon as this has occurred, the mirror 6 returns again into the angular viewing position. In timed succession, the diaphragm blades 24 then also change over from the fully closed position to the fully open position, i.e. after the coils 14 and 15 of both driving systems A and B are again energized for this purpose, thereby permitting the mirror to be used for full aperture viewing and for sensing ambient light via the photodiode in the usual manner for taking the next photograph, whereupon the entire sequence may be repeated when the camera release button 8 is again pressed.

As indicated in the functional diagram of FIG. 9 in chain-dotted lines, the diaphragm blades need not be returned to the fully closed position when the need for measurement of the film light in terms of that entering through the viewing lens may be dispensed with, as the artisan will appreciate. In this case, it suffices to return the diaphragm blades 24 in concordant manner appropriately from the fully open position, e.g. to an aperture width which is slightly smaller than that of the aperture value "22." Hence, the counterstop pin 52 during preselection of the aperture value "22" in accordance with this feature need only be furnished with an adequate, if even lesser, path distance corresponding to that for appropriately abutting against the path limiting stop 38 as desired.

Accordingly, the present invention advantageously provides a simple and versatile photographic camera apparatus, comprising objective means incorporating an electrodynamically drivable diaphragm aperature blade system, control circuit means for controlling the operating of the diaphragm blade system and adapted to operate in dependence upon sensed ambient light, and selector means associated with the control circuit means and adjustable to a manual mode MAN and at least one automatic mode AUTO, which when adjusted to the manual mode MAN operatively permits the diaphragm blade system to be adjusted to a manually preselected aperture width and which when adjusted to the at least one automatic mode AUTO operatively permits the diaphragm blade system to be automatically adjusted to an aperture width in dependence upon sensed ambient light.

In this regard, the diaphragm blade system includes a driving member operatively arranged for adjustment movement and which is controlled by the circuit means and adapted for actuating the diaphragm blades in accordance with such adjustment movement and which has operatively associated therewith an electromagnetically actuatable path limiting stop, said stop being operatively positioned at a basic inactive location stop position which is variable relative to the driving member by means of a manually actuated diaphragm aperture width preselector for adjusting the stop to a stop position corresponding to the manually preselected diaphragm aperture width, and which stop, when the selector means are adjusted to the manual mode MAN, becomes operative and is controlled by the circuit means for actuation to an active location stop position for terminating operatively the adjustment movement of the driving member at said stop position in accordance with the manually preselected diaphragm aperture width, but which, when the selector means are adjusted to the at least one automatic mode AUTO, becomes inoperative.

Preferably, the path limiting stop is adjustable in an adjustment direction of movement relative to the direction of adjustment movement of the driving member, and is movable from said inactive location stop position to said active location stop position and returnable from said active location stop position to said inactive location stop position substantially at right angles to its own adjustment direction of movement.

More specifically, the path limiting stop may be operatively mounted relatively displaceably on a pivotable setting lever which is pivotably mounted on a fixed pivot, and the setting lever in turn may be operatively connected with a control cam provided on the manually actuated diaphragm aperture width preselector for controlling the pivotal adjustment of the setting lever and in turn said stop position of said stop.

Suitably, electromagnetic means including an anchor lever are operatively provided in the control circuit means, and the anchor lever is operatively connected with the path limiting stop for actuation of said stop from said inactive location stop position to said active location stop position for terminating the movement of the driving member at said stop position.

Favorably, the path limiting stop cooperates with a counterstop pin located on the driving member, and preferably having a semicircular or hemispherical pin cross section, arranged for operatively engaging the path limiting stop at said active location stop position for terminating the movement of the driving member at said stop position, i.e. only when the stop is operatively aligned with the semicircular or hemispherical pin portion of such counterstop pin.

Stated another way, the present invention concerns a photographic camera apparatus comprising a driving member operatively arranged for electrically energized movement along a path and adapted for adjusting a diaphragm blade aperture system, a path limiting stop operatively arranged for manually adjustable positioning at an adjustable point along said path and for electrically energized movement into said path for operatively terminating the movement of the driving member at said point, control circuit means operatively arranged for controlling the electrically energized movement of the driving member and the electrically energized movement of the path limiting stop, and operatively adapted for response to ambient light sensing means for selectively controlling the electrically energized movement of the driving member for automatically selecting the movement position of the driving member along said path in dependence upon sensed ambient light, and selector means.

In this regard, the selector means are adjustable between a manual mode position operatively arranged for controlling the circuit means for energized movement of the path limiting stop into said path and for corresponding energized movement of the driving member until operatively terminated by said stop, and at least one automatic mode position operatively arranged for controlling the circuit means and adapted for energized movement of the driving member in dependence upon sensed ambient light, and said stop is energizable for movement into said path only when said selector means are adjusted to the manual mode position.

More specifically, electrodynamic drive means are provided in the circuit means for electrically energized movement of the driving member along said path and electromagnetic means are provided in the circuit means for electrically energized movement of the path limiting stop into said path, and the path limiting stop is manually adjustable in a direction of movement relative to the direction of movement and path of the driving member and upon electrical energization said stop is movable substantially at right angles to the direction of movement of said stop, and likewise to the direction of movement of the driving member, and from an inactive location out of said path at said adjustable point to a corresponding active location in said path for terminating the movement of the driving member.

Advantageously, a setting lever is provided which is pivotably mounted on a fixed pivot adjacent said path and operatively controlled by a manually adjustable diaphragm preselector control cam for pivotal movement for adjusting the position of the setting lever relative to said path, and the path limiting stop is operatively displaceably mounted for movement with the setting lever to change said adjustable point in dependence upon the adjustment of the control cam and for energized movement relative to the setting lever and into said path at said adjustable point.

Preferably, the electromagnetic means includes an anchor lever operatively connected with the path limiting stop for moving said stop into said path at said adjustable point upon electrical energization of the electromagnetic means.

Moreover, the path limiting stop preferably cooperates with a counterstop pin located on the driving member and having a semicircular or hemispherical pin cross section arranged for operatively engaging the path limiting stop only when said stop has been moved into said path.

It will be realized that the foregoing specification and accompanying drawings are set forth by way of illustration and not limitation, and that various modifications and changes may be made therein without departing from the spirit and scope of the present invention which is to be limited solely by the scope of the appended claims.

What is claimed is:

1. Photographic camera apparatus, such as a reflex camera, comprising objective means incorporating an electrodynamically drivable diaphragm aperture blade system, circuit means for controlling the operation of the diaphragm blade system and adapted to operate in dependence upon sensed ambient light, and selector means associated with the circuit means and adjustable to a manual mode MAN and at least one automatic mode AUTO, which when adjusted to the manual mode MAN operatively permits the diaphragm blade system to be adjusted to a manually preselected aperture width and which when adjusted to the at least one automatic mode AUTO operatively permits the diaphragm blade system to be automatically adjusted to an aperture width adjusted in dependence upon sensed ambient light, said diaphragm blade system including a driving member operatively arranged for adjustment movement and which is controlled by the circuit means and adapted for actuating the diaphragm blades in accordance with such adjustment movement, and which has operatively associated therewith an electromagnetically actuatable path limiting stop, said stop being operatively positioned at a basic inactive location stop position which is variable relative to the driving member by means of a manually actuated diaphragm aperture width preselector for adjusting the stop to a stop position corresponding to the manually preselected diaphragm aperture width, and which stop, when the selector means are adjusted to the manual mode MAN, becomes operative and is controlled by the circuit means for actuation to an active location stop position for terminating operatively the adjustment movement of the driving member at said stop position in accordance with the manually preselected diaphragm aperture width, but which, when the selector means are adjusted to the at least one automatic mode AUTO, becomes inoperative.

2. Apparatus according to claim 1 wherein the path limiting stop is adjustable in an adjustment direction of movement relative to the direction of adjustment movement of the driving member, and is movable from said inactive location stop position to said active location stop position and returnable from said active location stop position to said inactive location stop position substantially at right angles to its own adjustment direction of movement.

3. Apparatus according to claim 2 wherein the path limiting stop is operatively mounted relatively displaceably on a pivotable setting lever which is pivotably mounted on a fixed pivot, and the setting lever is operatively connected with a control cam provided on the manually actuated diaphragm aperture width preselector for controlling the pivotal adjustment of the setting lever and in turn said stop position of said stop.

4. Apparatus according to claim 3 wherein electromagnetic means including an anchor lever are provided in the circuit means, and the anchor lever is operatively connected with the path limiting stop for actuation of said stop from said inactive location stop position to said active location stop position for terminating the movement of the driving member at said stop position.

5. Apparatus according to claim 1 wherein the path limiting stop cooperates with a counterstop pin located on the driving member and having a semicircular pin cross section arranged for operatively engaging the path limiting stop at said active location stop position for terminating the movement of the driving member at said stop position.

6. Photographic camera apparatus comprising a driving member operatively arranged for electrically energized movement along a path and adapted for adjusting a diaphragm blade aperture system, a path limiting stop operatively arranged for manually adjustable positioning at an adjustable point along said path and for electrically energized movement into said path for operatively terminating the movement of the driving member at said point, circuit means operatively arranged for controlling the electrically energized movement of the driving member and the electrically energized movement of the path limiting stop, and operatively adapted for response to ambient light sensing means for selectively controlling the electrically energized movement of the driving member for automatically selecting the movement position of the driving member along said path in dependence upon sensed ambient light, and selector means adjustable between a manual mode position operatively arranged for controlling the circuit means for energized movement of the path limiting stop into said path and for corresponding energized movement of the driving member until operatively terminated by said stop, and at least one automatic mode position operatively arranged for controlling the circuit means and adapted for energized movement of the driving member in dependence upon sensed ambient light, said stop being energizable for movement into said path only when said selector means are adjusted to the manual mode position.

7. Apparatus according to claim 6 wherein electrodynamic drive means are provided in the circuit means for electrically energized movement of the driving member along said path and electromagnetic means are provided in the circuit means for electrically energized movement of the path limiting stop into said path, and wherein the path limiting stop is manually adjustable in a direction of movement relative to the direction of movement of the driving member and upon electrical energization said stop is movable substantially at right angles to the direction of movement of said stop and from an inactive location out of said path at said adjustable point to a corresponding active location in said path for terminating the movement of the driving member.

8. Apparatus according to claim 7 wherein a setting lever is provided which is pivotally mounted on a fixed pivot adjacent said path and operatively controlled by a manually adjustable diaphragm preselector control cam for pivotal movement for adjusting the position of the setting lever relative to said path, and the path limiting stop is operatively displaceably mounted for movement with the setting lever to change said adjustable point in dependence upon the adjustment of the control cam and for energized movement relative to the setting lever and into said path at said adjustable point.

9. Apparatus according to claim 8 wherein the electromagnetic means includes an anchor lever operatively connected with the path limiting stop for moving said stop into said path at said adjustable point upon electrical energization of the electromagnetic means.

10. Apparatus according to claim 6 wherein the path limiting stop cooperates with a counterstop pin located on the driving member and having a semicircular pin cross section arranged for operatively engaging the path limiting stop only when said stop has been moved into said path.

* * * * *